(12) United States Patent
Chiu et al.

(10) Patent No.: US 11,227,058 B2
(45) Date of Patent: Jan. 18, 2022

(54) SYSTEM AND METHOD FOR SHREDDING A FORUM OF SECRETS

(71) Applicant: EMC IP Holding Company, LLC, Hopkinton, MA (US)

(72) Inventors: Naizhong Chiu, Newton, MA (US); Gregory W. Lazar, Upton, MA (US); Grace L. Heard, Seattle, WA (US)

(73) Assignee: EMC IP HOLDING COMPANY, LLC, Hopkinton, MA (US)

( * ) Notice: Subject to any disclaimer, the term of this patent is extended or adjusted under 35 U.S.C. 154(b) by 218 days.

(21) Appl. No.: 16/526,464

(22) Filed: Jul. 30, 2019

(65) Prior Publication Data

US 2021/0034774 A1  Feb. 4, 2021

(51) Int. Cl.
*G06F 21/62* (2013.01)
*G06F 21/60* (2013.01)
*H04L 9/08* (2006.01)

(52) U.S. Cl.
CPC ........ *G06F 21/6227* (2013.01); *G06F 21/602* (2013.01); *H04L 9/0894* (2013.01); *G06F 2221/0751* (2013.01)

(58) Field of Classification Search
CPC ... G06F 21/6227; G06F 21/602; H04L 9/0894
USPC .......................................................... 713/193
See application file for complete search history.

(56) References Cited

U.S. PATENT DOCUMENTS

| | | | |
|---|---|---|---|
| 10,110,383 B1* | 10/2018 | Tamilarasan | H04L 9/3247 |
| 2013/0067242 A1* | 3/2013 | Lyakhovitskiy | G06F 21/78 713/193 |
| 2017/0085374 A1* | 3/2017 | Chen | H04L 9/083 |
| 2017/0103025 A1* | 4/2017 | Meyer | H04L 9/0618 |
| 2019/0068615 A1* | 2/2019 | Pack | H04L 9/3236 |

* cited by examiner

*Primary Examiner* — Kambiz Zand
*Assistant Examiner* — Phuc Pham
(74) *Attorney, Agent, or Firm* — Brian J. Colandreo; Mark H. Whittenberger; Holland & Knight LLP

(57) ABSTRACT

A method, computer program product, and computer system for storing, by a computing device, a data encryption key in a keystore. A plurality of stable system values may be generated, wherein a threshold number of the plurality of stable system values is required to access the data encryption key from the keystore. The plurality of stable system values may be stored in different locations. More stable system values of the plurality of stable system values than the threshold number of the plurality of stable system values required to access the data encryption key from the keystore may be deleted.

18 Claims, 4 Drawing Sheets

SYSTEM AND METHOD FOR SHREDDING A FORUM OF SECRETS

BACKGROUND

A typical shredding scheme, involves the use of a wrapping key or Key Encryption Key (KEK), and a Data Encryption Key (DEK), where generally for each drive in the system, there is a corresponding DEK. When the DEKs are stored, they are usually "wrapped" or encrypted using the KEK. When it is time to shred one or more DEKs, a new KEK is generated, all of the DEKs are rewrapped and stored with the new KEK, and the old KEK is erased. Presumably, the old KEK is stored in erasable memory/storage. From a redundancy standpoint, this may be problematic, since if that memory is lost for some reason (e.g., hardware issue), the DEKs cannot typically be unwrapped. Further, the process of re-wrapping the DEKs, when a new KEK is created, may temporarily expose all of the DEKs in plaintext in memory.

BRIEF SUMMARY OF DISCLOSURE

In one example implementation, a method, performed by one or more computing devices, may include but is not limited to storing, by a computing device, a data encryption key in a keystore. A plurality of stable system values may be generated, wherein a threshold number of the plurality of stable system values is required to access the data encryption key from the keystore. The plurality of stable system values may be stored in different locations. More stable system values of the plurality of stable system values than the threshold number of the plurality of stable system values required to access the data encryption key from the keystore may be deleted.

One or more of the following example features may be included. At least one location of the plurality of locations may include electrically erasable programmable read-only memory. At least one location of the plurality of locations may include a self-encrypting hard drive (SED). A range on the SED may store one or more of the plurality of stable system values. The range on the SED may be locked with a unique PIN. The data encryption key may be a unique data encryption key provisioned for the SED. Deleting more stable system values of the plurality of stable system values than the threshold number of the plurality of stable system values required to access the data encryption key may include reprogramming at least a portion of the plurality of stable system values with new stable system values.

In another example implementation, a computing system may include one or more processors and one or more memories configured to perform operations that may include but are not limited to storing a data encryption key in a keystore. A plurality of stable system values may be generated, wherein a threshold number of the plurality of stable system values is required to access the data encryption key from the keystore. The plurality of stable system values may be stored in different locations. More stable system values of the plurality of stable system values than the threshold number of the plurality of stable system values required to access the data encryption key from the keystore may be deleted.

One or more of the following example features may be included. At least one location of the plurality of locations may include electrically erasable programmable read-only memory. At least one location of the plurality of locations may include a self-encrypting hard drive (SED). A range on the SED may store one or more of the plurality of stable system values. The range on the SED may be locked with a unique PIN. The data encryption key may be a unique data encryption key provisioned for the SED. Deleting more stable system values of the plurality of stable system values than the threshold number of the plurality of stable system values required to access the data encryption key may include reprogramming at least a portion of the plurality of stable system values with new stable system values.

In another example implementation, a computer program product may reside on a computer readable storage medium having a plurality of instructions stored thereon which, when executed across one or more processors, may cause at least a portion of the one or more processors to perform operations that may include but are not limited to storing a data encryption key in a keystore. A plurality of stable system values may be generated, wherein a threshold number of the plurality of stable system values is required to access the data encryption key from the keystore. The plurality of stable system values may be stored in different locations. More stable system values of the plurality of stable system values than the threshold number of the plurality of stable system values required to access the data encryption key from the keystore may be deleted.

One or more of the following example features may be included. At least one location of the plurality of locations may include electrically erasable programmable read-only memory. At least one location of the plurality of locations may include a self-encrypting hard drive (SED). A range on the SED may store one or more of the plurality of stable system values. The range on the SED may be locked with a unique PIN. The data encryption key may be a unique data encryption key provisioned for the SED. Deleting more stable system values of the plurality of stable system values than the threshold number of the plurality of stable system values required to access the data encryption key may include reprogramming at least a portion of the plurality of stable system values with new stable system values.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

System Overview

Figure 1:
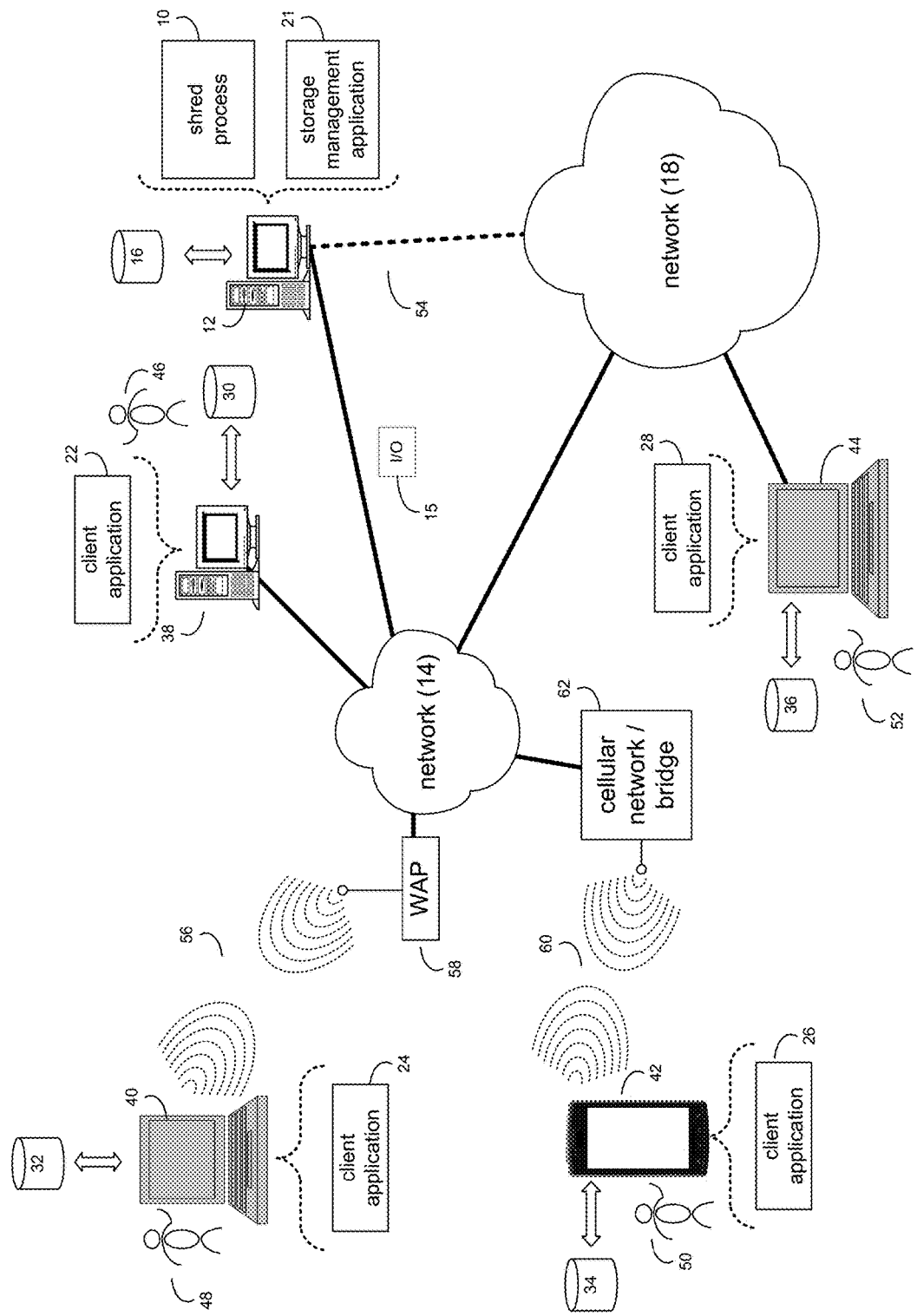
FIG. 1 is an example diagrammatic view of a shred process coupled to an example distributed computing network according to one or more example implementations of the disclosure.

In some implementations, the present disclosure may be embodied as a method, system, or computer program product. Accordingly, in some implementations, the present disclosure may take the form of an entirely hardware implementation, an entirely software implementation (including firmware, resident software, micro-code, etc.) or an implementation combining software and hardware aspects that may all generally be referred to herein as a "circuit," "module" or "system." Furthermore, in some implementations, the present disclosure may take the form of a computer program product on a computer-usable storage medium having computer-usable program code embodied in the medium.

In some implementations, any suitable computer usable or computer readable medium (or media) may be utilized. The computer readable medium may be a computer readable signal medium or a computer readable storage medium. The computer-usable, or computer-readable, storage medium (including a storage device associated with a computing device or client electronic device) may be, for example, but is not limited to, an electronic, magnetic, optical, electromagnetic, infrared, or semiconductor system, apparatus, device, or any suitable combination of the foregoing. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a digital versatile disk (DVD), a static random access memory (SRAM), a memory stick, a floppy disk, a mechanically encoded device such as punch-cards or raised structures in a groove having instructions recorded thereon, a media such as those supporting the internet or an intranet, or a magnetic storage device. Note that the computer-usable or computer-readable medium could even be a suitable medium upon which the program is stored, scanned, compiled, interpreted, or otherwise processed in a suitable manner, if necessary, and then stored in a computer memory. In the context of the present disclosure, a computer-usable or computer-readable, storage medium may be any tangible medium that can contain or store a program for use by or in connection with the instruction execution system, apparatus, or device.

In some implementations, a computer readable signal medium may include a propagated data signal with computer readable program code embodied therein, for example, in baseband or as part of a carrier wave. In some implementations, such a propagated signal may take any of a variety of forms, including, but not limited to, electro-magnetic, optical, or any suitable combination thereof. In some implementations, the computer readable program code may be transmitted using any appropriate medium, including but not limited to the internet, wireline, optical fiber cable, RF, etc. In some implementations, a computer readable signal medium may be any computer readable medium that is not a computer readable storage medium and that can communicate, propagate, or transport a program for use by or in connection with an instruction execution system, apparatus, or device.

In some implementations, computer program code for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java++, Smalltalk, C++ or the like. Java® and all Java-based trademarks and logos are trademarks or registered trademarks of Oracle and/or its affiliates. However, the computer program code for carrying out operations of the present disclosure may also be written in conventional procedural programming languages, such as the "C" programming language, PASCAL, or similar programming languages, as well as in scripting languages such as Javascript, PERL, or Python. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the internet using an Internet Service Provider). In some implementations, electronic circuitry including, for example, programmable logic circuitry, field-programmable gate arrays (FPGAs) or other hardware accelerators, micro-controller units (MCUs), or programmable logic arrays (PLAs) may execute the computer readable program instructions/code by utilizing state information of the computer readable program instructions to personalize the electronic circuitry, in order to perform aspects of the present disclosure.

In some implementations, the flowchart and block diagrams in the figures illustrate the architecture, functionality, and operation of possible implementations of apparatus (systems), methods and computer program products according to various implementations of the present disclosure. Each block in the flowchart and/or block diagrams, and combinations of blocks in the flowchart and/or block diagrams, may represent a module, segment, or portion of code, which comprises one or more executable computer program instructions for implementing the specified logical function(s)/act(s). These computer program instructions may be provided to a processor of a general purpose computer, special purpose computer, or other programmable data processing apparatus to produce a machine, such that the computer program instructions, which may execute via the processor of the computer or other programmable data processing apparatus, create the ability to implement one or more of the functions/acts specified in the flowchart and/or block diagram block or blocks or combinations thereof. It should be noted that, in some implementations, the functions noted in the block(s) may occur out of the order noted in the figures (or combined or omitted). For example, two blocks shown in succession may, in fact, be executed substantially concurrently, or the blocks may sometimes be executed in the reverse order, depending upon the functionality involved.

In some implementations, these computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks or combinations thereof.

In some implementations, the computer program instructions may also be loaded onto a computer or other programmable data processing apparatus to cause a series of operational steps to be performed (not necessarily in a particular order) on the computer or other programmable apparatus to produce a computer implemented process such that the instructions which execute on the computer or other programmable apparatus provide steps for implementing the functions/acts (not necessarily in a particular order) specified in the flowchart and/or block diagram block or blocks or combinations thereof.

Referring now to the example implementation of FIG. 1, there is shown shred process 10 that may reside on and may be executed by a computer (e.g., computer 12), which may be connected to a network (e.g., network 14) (e.g., the internet or a local area network). Examples of computer 12 (and/or one or more of the client electronic devices noted below) may include, but are not limited to, a storage system (e.g., a Network Attached Storage (NAS) system, a Storage Area Network (SAN)), a personal computer(s), a laptop computer(s), mobile computing device(s), a server computer, a series of server computers, a mainframe computer (s), or a computing cloud(s). As is known in the art, a SAN may include one or more of the client electronic devices, including a RAID device and a NAS system. In some implementations, each of the aforementioned may be generally described as a computing device. In certain implementations, a computing device may be a physical or virtual device. In many implementations, a computing device may be any device capable of performing operations, such as a dedicated processor, a portion of a processor, a virtual processor, a portion of a virtual processor, portion of a virtual device, or a virtual device. In some implementations, a processor may be a physical processor or a virtual processor. In some implementations, a virtual processor may correspond to one or more parts of one or more physical processors. In some implementations, the instructions/logic may be distributed and executed across one or more processors, virtual or physical, to execute the instructions/logic. Computer 12 may execute an operating system, for example, but not limited to, Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a shred process, such as shred process 10 of FIG. 1, may store, by a computing device, a data encryption key in a keystore. A plurality of stable system values may be generated, wherein a threshold number of the plurality of stable system values is required to access the data encryption key from the keystore. The plurality of stable system values may be stored in different locations. More stable system values of the plurality of stable system values than the threshold number of the plurality of stable system values required to access the data encryption key from the keystore may be deleted.

In some implementations, the instruction sets and subroutines of shred process 10, which may be stored on storage device, such as storage device 16, coupled to computer 12, may be executed by one or more processors and one or more memory architectures included within computer 12. In some implementations, storage device 16 may include but is not limited to: a hard disk drive; all forms of flash memory storage devices; a tape drive; an optical drive; a RAID array (or other array); a random access memory (RAM); a read-only memory (ROM); or combination thereof. In some implementations, storage device 16 may be organized as an extent, an extent pool, a RAID extent (e.g., an example 4D+1P R5, where the RAID extent may include, e.g., five storage device extents that may be allocated from, e.g., five different storage devices), a mapped RAID (e.g., a collection of RAID extents), or combination thereof.

In some implementations, network 14 may be connected to one or more secondary networks (e.g., network 18), examples of which may include but are not limited to: a local area network; a wide area network or other telecommunications network facility; or an intranet, for example. The phrase "telecommunications network facility," as used herein, may refer to a facility configured to transmit, and/or receive transmissions to/from one or more mobile client electronic devices (e.g., cellphones, etc.) as well as many others.

In some implementations, computer 12 may include a data store, such as a database (e.g., relational database, object-oriented database, triplestore database, etc.) and may be located within any suitable memory location, such as storage device 16 coupled to computer 12. In some implementations, data, metadata, information, etc. described throughout the present disclosure may be stored in the data store. In some implementations, computer 12 may utilize any known database management system such as, but not limited to, DB2, in order to provide multi-user access to one or more databases, such as the above noted relational database. In some implementations, the data store may also be a custom database, such as, for example, a flat file database or an XML database. In some implementations, any other form(s) of a data storage structure and/or organization may also be used. In some implementations, shred process 10 may be a component of the data store, a standalone application that interfaces with the above noted data store and/or an applet/application that is accessed via client applications 22, 24, 26, 28. In some implementations, the above noted data store may be, in whole or in part, distributed in a cloud computing topology. In this way, computer 12 and storage device 16 may refer to multiple devices, which may also be distributed throughout the network.

In some implementations, computer 12 may execute a storage management application (e.g., storage management application 21), examples of which may include, but are not limited to, e.g., a storage system application, a cloud computing application, a data synchronization application, a data migration application, a garbage collection application, or other application that allows for the implementation and/or management of data in a clustered (or non-clustered) environment (or the like). In some implementations, shred process 10 and/or storage management application 21 may be accessed via one or more of client applications 22, 24, 26, 28. In some implementations, shred process 10 may be a standalone application, or may be an applet/application/script/extension that may interact with and/or be executed within storage management application 21, a component of storage management application 21, and/or one or more of client applications 22, 24, 26, 28. In some implementations, storage management application 21 may be a standalone application, or may be an applet/application/script/extension that may interact with and/or be executed within shred process 10, a component of shred process 10, and/or one or more of client applications 22, 24, 26, 28. In some implementations, one or more of client applications 22, 24, 26, 28 may be a standalone application, or may be an applet/application/script/extension that may interact with and/or be executed within and/or be a component of shred process 10 and/or storage management application 21. Examples of client applications 22, 24, 26, 28 may include, but are not limited to, e.g., a storage system application, a cloud computing application, a data synchronization application, a data migration application, a garbage collection application, or other application that allows for the implementation and/or management of data in a clustered (or non-clustered) environment (or the like), a standard and/or mobile web browser, an email application (e.g., an email client application), a textual and/or a graphical user interface, a customized web browser, a plugin, an Application Programming Interface (API), or a custom application. The instruction sets and subroutines of client applications 22, 24, 26, 28, which may be stored on storage devices 30, 32, 34, 36, coupled to client electronic devices 38, 40, 42, 44, may be executed by one or more processors and one or more memory architectures incorporated into client electronic devices 38, 40, 42, 44.

In some implementations, one or more of storage devices 30, 32, 34, 36, may include but are not limited to: hard disk drives; flash drives, tape drives; optical drives; RAID arrays; random access memories (RAM); and read-only memories (ROM). Examples of client electronic devices 38, 40, 42, 44 (and/or computer 12) may include, but are not limited to, a personal computer (e.g., client electronic device 38), a laptop computer (e.g., client electronic device 40), a smart/data-enabled, cellular phone (e.g., client electronic device 42), a notebook computer (e.g., client electronic device 44), a tablet, a server, a television, a smart television, a smart speaker, an Internet of Things (IoT) device, a media (e.g., video, photo, etc.) capturing device, and a dedicated network device. Client electronic devices 38, 40, 42, 44 may each execute an operating system, examples of which may include but are not limited to, Android, Apple® iOS®, Mac® OS X®; Red Hat® Linux®, Windows® Mobile, Chrome OS, Blackberry OS, Fire OS, or a custom operating system.

In some implementations, one or more of client applications 22, 24, 26, 28 may be configured to effectuate some or all of the functionality of shred process 10 (and vice versa). Accordingly, in some implementations, shred process 10 may be a purely server-side application, a purely client-side application, or a hybrid server-side/client-side application that is cooperatively executed by one or more of client applications 22, 24, 26, 28 and/or shred process 10.

In some implementations, one or more of client applications 22, 24, 26, 28 may be configured to effectuate some or all of the functionality of storage management application 21 (and vice versa). Accordingly, in some implementations, storage management application 21 may be a purely server-side application, a purely client-side application, or a hybrid server-side/client-side application that is cooperatively executed by one or more of client applications 22, 24, 26, 28 and/or storage management application 21. As one or more of client applications 22, 24, 26, 28, shred process 10, and storage management application 21, taken singly or in any combination, may effectuate some or all of the same functionality, any description of effectuating such functionality via one or more of client applications 22, 24, 26, 28, shred process 10, storage management application 21, or combination thereof, and any described interaction(s) between one or more of client applications 22, 24, 26, 28, shred process 10, storage management application 21, or combination thereof to effectuate such functionality, should be taken as an example only and not to limit the scope of the disclosure.

In some implementations, one or more of users 46, 48, 50, 52 may access computer 12 and shred process 10 (e.g., using one or more of client electronic devices 38, 40, 42, 44) directly through network 14 or through secondary network 18. Further, computer 12 may be connected to network 14 through secondary network 18, as illustrated with phantom link line 54. Shred process 10 may include one or more user interfaces, such as browsers and textual or graphical user interfaces, through which users 46, 48, 50, 52 may access shred process 10.

In some implementations, the various client electronic devices may be directly or indirectly coupled to network 14 (or network 18). For example, client electronic device 38 is shown directly coupled to network 14 via a hardwired network connection. Further, client electronic device 44 is shown directly coupled to network 18 via a hardwired network connection. Client electronic device 40 is shown wirelessly coupled to network 14 via wireless communication channel 56 established between client electronic device 40 and wireless access point (i.e., WAP) 58, which is shown directly coupled to network 14. WAP 58 may be, for example, an IEEE 802.11a, 802.11b, 802.11g, 802.11n, 802.11ac, Wi-Fi®, RFID, and/or Bluetooth™ (including Bluetooth™ Low Energy) device that is capable of establishing wireless communication channel 56 between client electronic device 40 and WAP 58. Client electronic device 42 is shown wirelessly coupled to network 14 via wireless communication channel 60 established between client electronic device 42 and cellular network/bridge 62, which is shown by example directly coupled to network 14.

In some implementations, some or all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth™ (including Bluetooth™ Low Energy) is a telecommunications industry specification that allows, e.g., mobile phones, computers, smart phones, and other electronic devices to be interconnected using a short-range wireless connection. Other forms of interconnection (e.g., Near Field Communication (NFC)) may also be used.

In some implementations, various I/O requests (e.g., I/O request 15) may be sent from, e.g., client applications 22, 24, 26, 28 to, e.g., computer 12. Examples of I/O request 15 may include but are not limited to, data write requests (e.g., a request that content be written to computer 12) and data read requests (e.g., a request that content be read from computer 12).

Data Storage System

Figure 2:
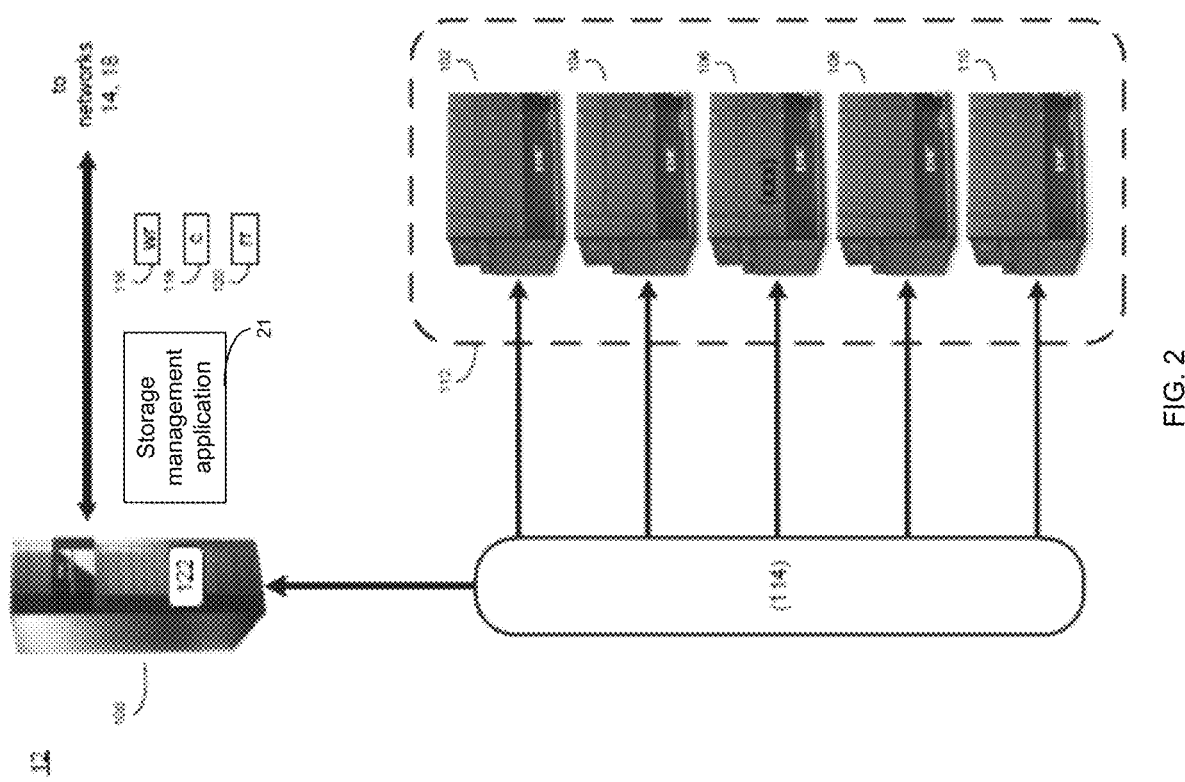
FIG. 2 is an example diagrammatic view of a storage system of FIG. 1 according to one or more example implementations of the disclosure.
Figure 3:
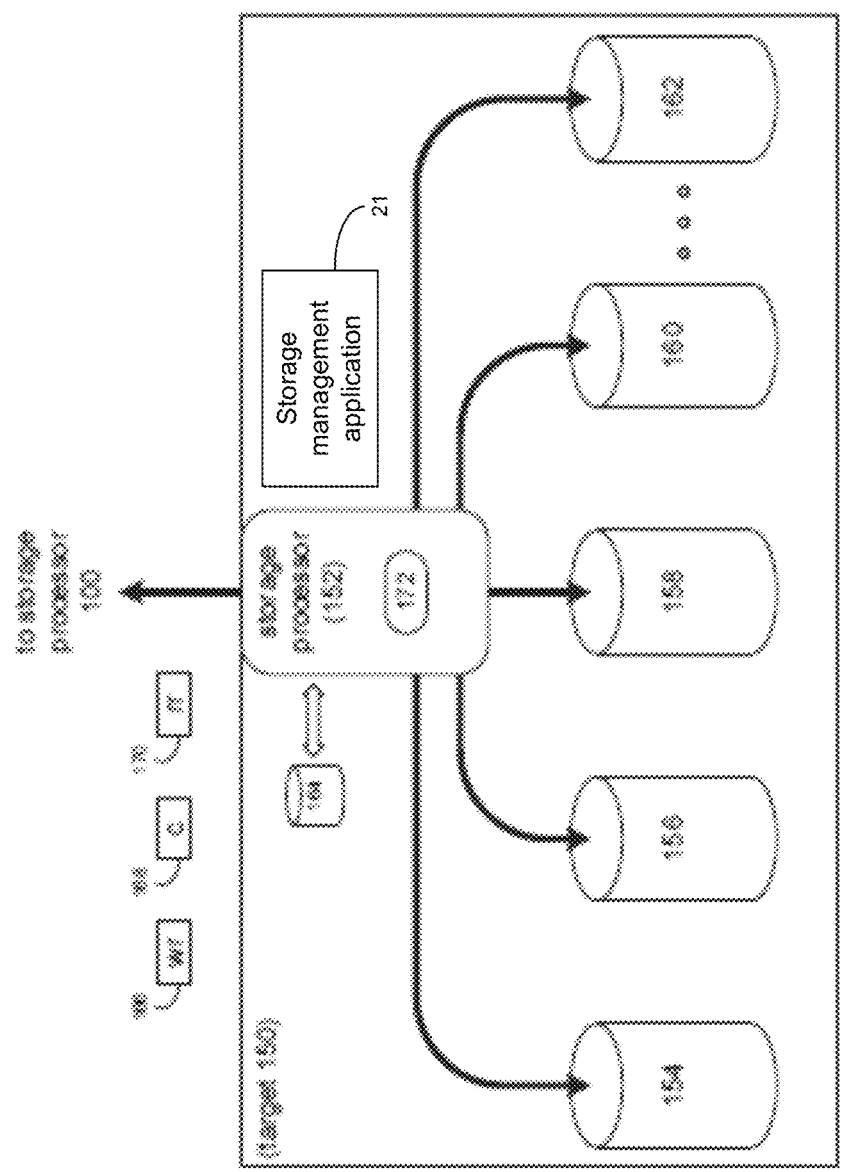
FIG. 3 is an example diagrammatic view of a storage target of FIG. 1 according to one or more example implementations of the disclosure.

Referring also to the example implementation of FIGS. 2-3 (e.g., where computer 12 may be configured as a data storage system), computer 12 may include storage processor 100 and a plurality of storage targets (e.g., storage targets 102, 104, 106, 108, 110). In some implementations, storage targets 102, 104, 106, 108, 110 may include any of the above-noted storage devices. In some implementations, storage targets 102, 104, 106, 108, 110 may be configured to provide various levels of performance and/or high availability. For example, storage targets 102, 104, 106, 108, 110 may be configured to form a non-fully-duplicative fault-tolerant data storage system (such as a non-fully-duplicative RAID data storage system), examples of which may include but are not limited to: RAID 3 arrays, RAID 4 arrays, RAID 5 arrays, and/or RAID 6 arrays. It will be appreciated that various other types of RAID arrays may be used without departing from the scope of the present disclosure.

While in this particular example, computer 12 is shown to include five storage targets (e.g., storage targets 102, 104, 106, 108, 110), this is for example purposes only and is not intended limit the present disclosure. For instance, the actual number of storage targets may be increased or decreased depending upon, e.g., the level of redundancy/performance/capacity required.

Further, the storage targets (e.g., storage targets 102, 104, 106, 108, 110) included with computer 12 may be configured to form a plurality of discrete storage arrays. For instance, and assuming for example purposes only that computer 12 includes, e.g., ten discrete storage targets, a first five targets (of the ten storage targets) may be configured to form a first RAID array and a second five targets (of the ten storage targets) may be configured to form a second RAID array.

In some implementations, one or more of storage targets 102, 104, 106, 108, 110 may be configured to store coded data (e.g., via storage management process 21), wherein such coded data may allow for the regeneration of data lost/corrupted on one or more of storage targets 102, 104, 106, 108, 110. Examples of such coded data may include but is not limited to parity data and Reed-Solomon data. Such coded data may be distributed across all of storage targets 102, 104, 106, 108, 110 or may be stored within a specific storage target.

Examples of storage targets 102, 104, 106, 108, 110 may include one or more data arrays, wherein a combination of storage targets 102, 104, 106, 108, 110 (and any processing/control systems associated with storage management application 21) may form data array 112.

The manner in which computer 12 is implemented may vary depending upon e.g., the level of redundancy/performance/capacity required. For example, computer 12 may be configured as a SAN (i.e., a Storage Area Network), in which storage processor 100 may be, e.g., a dedicated computing system and each of storage targets 102, 104, 106, 108, 110 may be a RAID device. An example of storage processor 100 may include but is not limited to a VPLEX system offered by Dell EMC of Hopkinton, Mass.

In the example where computer 12 is configured as a SAN, the various components of computer 12 (e.g., storage processor 100, and storage targets 102, 104, 106, 108, 110) may be coupled using network infrastructure 114, examples of which may include but are not limited to an Ethernet (e.g., Layer 2 or Layer 3) network, a fiber channel network, an InfiniB and network, or any other circuit switched/packet switched network.

As discussed above, various I/O requests (e.g., I/O request 15) may be generated. For example, these I/O requests may be sent from, e.g., client applications 22, 24, 26, 28 to, e.g., computer 12. Additionally/alternatively (e.g., when storage processor 100 is configured as an application server or otherwise), these I/O requests may be internally generated within storage processor 100 (e.g., via storage management process 21). Examples of I/O request 15 may include but are not limited to data write request 116 (e.g., a request that content 118 be written to computer 12) and data read request 120 (e.g., a request that content 118 be read from computer 12).

In some implementations, during operation of storage processor 100, content 118 to be written to computer 12 may be received and/or processed by storage processor 100 (e.g., via storage management process 21). Additionally/alternatively (e.g., when storage processor 100 is configured as an application server or otherwise), content 118 to be written to computer 12 may be internally generated by storage processor 100 (e.g., via storage management process 21).

As discussed above, the instruction sets and subroutines of storage management application 21, which may be stored on storage device 16 included within computer 12, may be executed by one or more processors and one or more memory architectures included with computer 12. Accordingly, in addition to being executed on storage processor 100, some or all of the instruction sets and subroutines of storage management application 21 (and/or shred process 10) may be executed by one or more processors and one or more memory architectures included with data array 112.

In some implementations, storage processor 100 may include front end cache memory system 122. Examples of front end cache memory system 122 may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

In some implementations, storage processor 100 may initially store content 118 within front end cache memory system 122. Depending upon the manner in which front end cache memory system 122 is configured, storage processor 100 (e.g., via storage management process 21) may immediately write content 118 to data array 112 (e.g., if front end cache memory system 122 is configured as a write-through cache) or may subsequently write content 118 to data array 112 (e.g., if front end cache memory system 122 is configured as a write-back cache).

In some implementations, one or more of storage targets 102, 104, 106, 108, 110 may include a backend cache memory system. Examples of the backend cache memory system may include but are not limited to a volatile, solid-state, cache memory system (e.g., a dynamic RAM cache memory system), a non-volatile, solid-state, cache memory system (e.g., a flash-based, cache memory system), and/or any of the above-noted storage devices.

Storage Targets

As discussed above, one or more of storage targets 102, 104, 106, 108, 110 may be a RAID device. For instance, and referring also to FIG. 3, there is shown example target 150, wherein target 150 may be one example implementation of a RAID implementation of, e.g., storage target 102, storage target 104, storage target 106, storage target 108, and/or storage target 110. An example of target 150 may include but is not limited to a VNX system offered by Dell EMC of Hopkinton, Mass. Examples of storage devices 154, 156, 158, 160, 162 may include one or more electro-mechanical hard disk drives, one or more solid-state/flash devices, and/or any of the above-noted storage devices. It will be appreciated that while the term "disk" or "drive" may be used throughout, these may refer to and be used interchangeably with any types of appropriate storage devices as the context and functionality of the storage device permits.

In some implementations, target 150 may include storage processor 152 and a plurality of storage devices (e.g., storage devices 154, 156, 158, 160, 162). Storage devices 154, 156, 158, 160, 162 may be configured to provide various levels of performance and/or high availability (e.g., via storage management process 21). For example, one or more of storage devices 154, 156, 158, 160, 162 (or any of the above-noted storage devices) may be configured as a RAID 0 array, in which data is striped across storage devices. By striping data across a plurality of storage devices, improved performance may be realized. However, RAID 0 arrays may not provide a level of high availability. Accordingly, one or more of storage devices 154, 156, 158, 160, 162 (or any of the above-noted storage devices) may be configured as a RAID 1 array, in which data is mirrored between storage devices. By mirroring data between storage devices, a level of high availability may be achieved as multiple copies of the data may be stored within storage devices 154, 156, 158, 160, 162.

While storage devices 154, 156, 158, 160, 162 are discussed above as being configured in a RAID 0 or RAID 1 array, this is for example purposes only and not intended to limit the present disclosure, as other configurations are possible. For example, storage devices 154, 156, 158, 160, 162 may be configured as a RAID 3, RAID 4, RAID 5 or RAID 6 array.

While in this particular example, target 150 is shown to include five storage devices (e.g., storage devices 154, 156, 158, 160, 162), this is for example purposes only and not intended to limit the present disclosure. For instance, the actual number of storage devices may be increased or decreased depending upon, e.g., the level of redundancy/performance/capacity required.

In some implementations, one or more of storage devices 154, 156, 158, 160, 162 may be configured to store (e.g., via storage management process 21) coded data, wherein such coded data may allow for the regeneration of data lost/corrupted on one or more of storage devices 154, 156, 158, 160, 162. Examples of such coded data may include but are not limited to parity data and Reed-Solomon data. Such coded data may be distributed across all of storage devices 154, 156, 158, 160, 162 or may be stored within a specific storage device.

The manner in which target 150 is implemented may vary depending upon e.g., the level of redundancy/performance/capacity required. For example, target 150 may be a RAID device in which storage processor 152 is a RAID controller card and storage devices 154, 156, 158, 160, 162 are individual "hot-swappable" hard disk drives. Another example of target 150 may be a RAID system, examples of which may include but are not limited to an NAS (i.e., Network Attached Storage) device or a SAN (i.e., Storage Area Network).

In some implementations, storage target 150 may execute all or a portion of storage management application 21. The instruction sets and subroutines of storage management application 21, which may be stored on a storage device (e.g., storage device 164) coupled to storage processor 152, may be executed by one or more processors and one or more memory architectures included with storage processor 152. Storage device 164 may include but is not limited to any of the above-noted storage devices.

As discussed above, computer 12 may be configured as a SAN, wherein storage processor 100 may be a dedicated computing system and each of storage targets 102, 104, 106, 108, 110 may be a RAID device. Accordingly, when storage processor 100 processes data requests 116, 120, storage processor 100 (e.g., via storage management process 21) may provide the appropriate requests/content (e.g., write request 166, content 168 and read request 170) to, e.g., storage target 150 (which is representative of storage targets 102, 104, 106, 108 and/or 110).

In some implementations, during operation of storage processor 152, content 168 to be written to target 150 may be processed by storage processor 152 (e.g., via storage management process 21). Storage processor 152 may include cache memory system 172. Examples of cache memory system 172 may include but are not limited to a volatile, solid-state, cache memory system (e.g., a dynamic RAM cache memory system) and/or a non-volatile, solid-state, cache memory system (e.g., a flash-based, cache memory system). During operation of storage processor 152, content 168 to be written to target 150 may be received by storage processor 152 (e.g., via storage management process 21) and initially stored (e.g., via storage management process 21) within front end cache memory system 172.

A typical shredding scheme, involves the use of a wrapping key or Key Encryption Key (KEK), and a Data Encryption Key (DEK), where generally for each drive in the system, there is a corresponding DEK. When the DEKs are stored, they are usually "wrapped" or encrypted using the KEK. When it is time to shred one or more DEKs, a new KEK is generated, all of the DEKs are rewrapped and stored with the new KEK, and the old KEK is erased. Presumably, the old KEK is stored in erasable memory/storage. From a redundancy standpoint, this may be problematic, since if that memory is lost for some reason (e.g., hardware issue), the DEKs cannot typically be unwrapped. Further, the process of re-wrapping the DEKs, when a new KEK is created, may temporarily expose all of the DEKs in plaintext in memory.

Some systems may use n out of k shares of a secret (e.g., value or pass-phrase used for master encryption key) to recover data it protects. This technique is used inside the lockbox toolkit, designed by EMC/DELL. A lockbox may be opened with a forum of stable system values. The lockbox may also be used to manage the keys for the drives, but there is no guarantee that the key material may be individually shredded.

Some systems may use a file system design with of storing shares of a secret, each encrypted with the public key of one of the ephemerizers, and achieving assured deletion through external ephemerizers. For the storage product, the system needs to be autonomous, and some configurations do not allow external server access, resulting in the need to store the secret share directly on the array, and the need to achieve the shredability by managing the deletion of each secret. Other designs may use HSM hardware to store secrets, but while it is shredable it does not provide redundancy. Because the encryption key needs to be protected in order to properly safe guard sensitive material, a copy cannot simply be created and randomly stored somewhere in the system without sacrificing the capability of permanently deleting the key. Without the redundancy, there is a risk of losing access to the information it protects. The challenge gets amplified when there are many encryption keys to manage in the same system.

Thus, as will be discussed below, the present disclosure may enable a "lockbox" type solution that avoids the need for dedicated hardware, HSM, and may reduce system cost. Unlike previous lockbox solutions, all stable system values may be randomly generated to enhance system security, and all stable system values may be securely cleaned up to prevent incidental leaking of data encryption keys. The reprogramming of all the stable system values provides equivalency of crypto-rekey/rewrap.

The Shred Process

Figure 4:
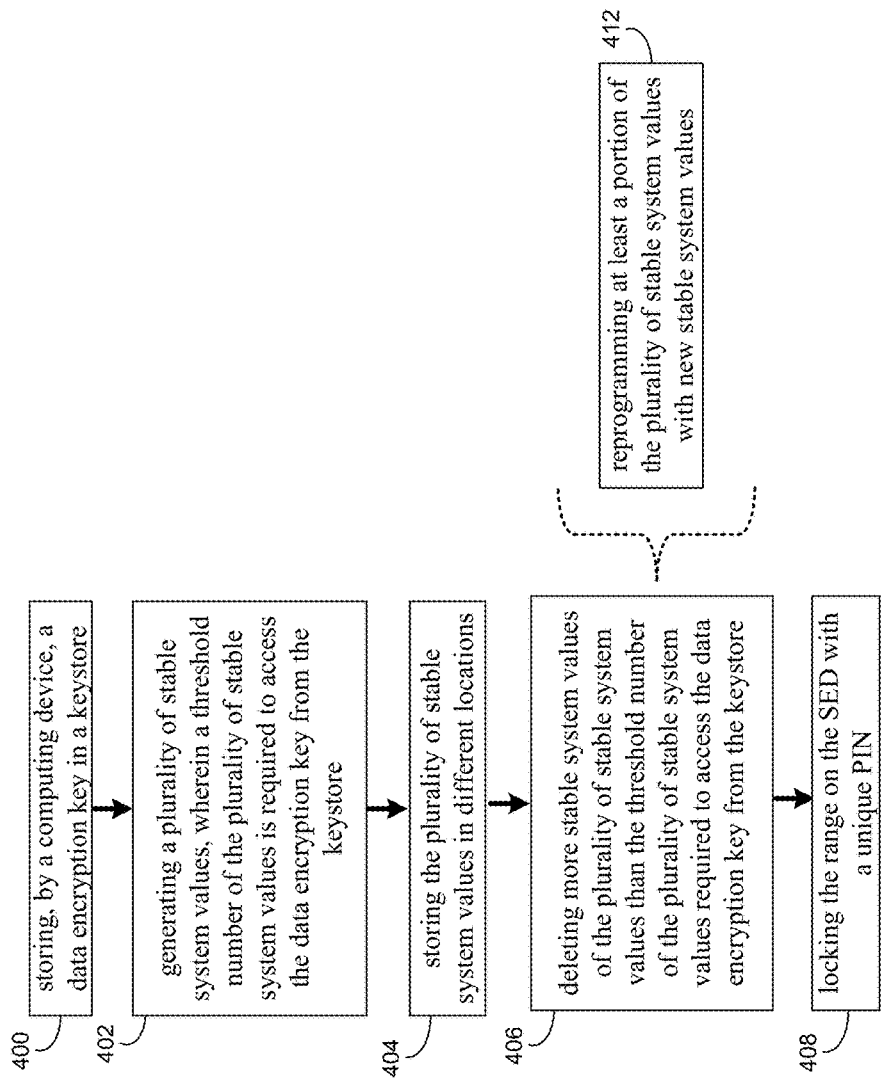
FIG. 4 is an example flowchart of a shred process according to one or more example implementations of the disclosure.

As discussed above and referring also at least to the example implementations of FIG. 4, shred process 10 may store 400, by a computing device, a data encryption key in a keystore. Shred process 10 may generate 402 a plurality of stable system values may be generated, wherein a threshold number of the plurality of stable system values is required to access the data encryption key from the keystore. Shred process 10 may store 404 the plurality of stable system values in different locations. Shred process 10 may delete 406 more stable system values of the plurality of stable system values than the threshold number of the plurality of stable system values required to access the data encryption key from the keystore.

As will be discussed below, shred process 10 may use a quorum of stable system values, where if it is time to delete one or more data encryption keys (DEKs), the threshold value of stable system values may be shredded and regenerated with new values (e.g., while holding the keystore open), after the DEKs have been removed from the keystore. A new copy of the keystore may be written with the DEKs removed and may be protected with "new" stable system values. The old copy is now inaccessible, as the stable system values associated with that copy of the keystore have been shredded. As such, redundancy is achieved with the use of multiple stable system values, and the system does not have to rewrap all of the DEKs with a Key Encryption Key (KEK), which may expose the plaintext DEKs.

In some implementations, shred process 10 may store 400 a data encryption key in a keystore, and in some implementations, shred process 10 may generate 402 a plurality of stable system values may be generated, wherein a threshold number of the plurality of stable system values is required to access the data encryption key from the keystore. For example, shred process 10 may generate and store a data encryption key. A forum of secrets (also known as stable system values) may be used to manage access to the data encryption key(s), thereby safeguarding them. For example, the encryption key may be stored in a "lockbox", which may itself be accessed only by knowing a majority of the stable system values. That is, with the majority of the stable system values (e.g., five out seven), the system may have access to the data encryption key (by using the stable system values to access the lockbox) where the data encryption key is stored. This forum of secrets (stable system values) provides much needed redundancy, since the system can afford to lose access to one or two secrets (e.g., when there are seven stable system values used) but still have access to the data encryption key in the lockbox, because the remaining five stable system values may be used to recreate the two lost stable system values. Thus, to achieve true "shredability," we only need to make sure the majority of secrets can be and are shredded, thereby making it impossible to recover all seven stable system values needed to access the data encryption key in the lockbox.

It will be appreciated that while "lockbox" may be a specific term for a specific system, any similar type of storage container, data store, or keystore, may be used without departing from the scope of the disclosure. As such, the use of "lockbox" should be taken as example only and not to otherwise limit the scope of the disclosure.

In some implementations, shred process 10 may store 404 the plurality of stable system values in different locations. For example, the plurality of stable system values may be stored 404 and reside on different parts of the system, and together they may represent the system as a whole. As will be discussed below, in some implementations, at least one location of the plurality of locations may include electrically erasable programmable read-only memory (EEPROM), and in some implementations at least one location of the plurality of locations may include a self-encrypting hard drive (SED).

In some implementations, shred process 10 may delete 406 more stable system values of the plurality of stable system values than the threshold number of the plurality of stable system values required to access the data encryption key from the keystore (where the encryption key is stored). For example, since the system can afford to lose access to one or two secrets (e.g., when there are seven stable system values used) but still have access to the data encryption key in the lockbox, to achieve true "shredability," shred process 10 may shred/delete more secrets than are needed to access the data encryption key in the lockbox. For example, if five out of seven stable system values are needed to access the encryption key, then shred process 10 may delete at least three of the stable system values. By doing this, only four stable system values would still exist, which in the example is not enough to recreate the seven stable system values required to access the data encryption key from the lockbox, thereby making it impossible to access the data encryption key to decrypt the safeguarded information. It will be appreciated that the number of stable system values generated and needed to access the data encryption key from the lockbox may be configurable by a user.

As noted above, one way to ensure that a majority of stable system values are capable of being deleted is to store, in some implementations, some of the stable system values on hardware (e.g., EEPROMs), and others stored on one or more SED drives. It may be much simpler to erase/clean up content on EEPROM, but doing so on an SED may require additional steps, making it more difficult to access the stable system values. For instance, in a system that has controller based encryption (e.g., the encryption is done in the controller card that interacts with the drives), what is shredded may be the actual data encryption key, as it may be managed by the system, and in an SED, in some implementations, a range on the SED may store one or more of the plurality of stable system values, and shred process 10 may lock 408 the range on the SED with a unique PIN. For example, on the SED, shred process 10 may declare a small range specifically for storing stable system values. Shred process 10 may lock that region with a system unique PIN, and may utilize SED genKey function (as an example) to regenerate media encryption key for this range to achieve secure deletion. With all the carefully selected and managed stable system values, shred process 10 may guarantee that the lockbox content (e.g., the encryption key(s)) may be safely shredded.

In some implementations, the data encryption key may be a unique data encryption key provisioned for the SED that may be deleted (e.g., when the SED is removed). For example, shred process 10 may provision a unique data encryption key for each drive (e.g., SED), which may be at least one of the data encryption keys in the lockbox. That is, shred process 10 may actually shred the SED passphrase or PIN (what is in the lockbox), and the data encryption key itself may be managed by the SED. As will be discussed below, when a drive is removed from the system, shred process 10 may delete the data encryption key associated with the removed drive from lockbox (or other type of encrypted storage container).

In some implementations, deleting more stable system values of the plurality of stable system values than the threshold number of the plurality of stable system values required to access the data encryption key may include reprogramming 412 at least a portion of the plurality of stable system values with new stable system values. For example, if a user wants to be sure the data encryption key can no longer be retrieved, shred process 10 may reprogram the stable system values, so that none of the old copy of the lockbox may be opened. That is, more than the threshold value of the stable system values may be shredded and regenerated with new values (e.g., while holding the keystore open), after the data encryption key has been removed from the keystore. A new copy of the keystore may be written with the data encryption key removed and is protected (e.g., reprogrammed) with "new" stable system values. The old copy is now inaccessible, as the stable system values associated with that copy of the keystore have been shredded. As such, it will not matter where the user has backed up the lockbox content.

The terminology used herein is for the purpose of describing particular implementations only and is not intended to be limiting of the disclosure. As used herein, the singular forms "a", "an" and "the" are intended to include the plural forms as well, unless the context clearly indicates otherwise. As used herein, the language "at least one of A, B, and C" (and the like) should be interpreted as covering only A, only B, only C, or any combination of the three, unless the context clearly indicates otherwise. It will be further understood that the terms "comprises" and/or "comprising," when used in this specification, specify the presence of stated features, integers, steps (not necessarily in a particular order), operations, elements, and/or components, but do not preclude the presence or addition of one or more other features, integers, steps (not necessarily in a particular order), operations, elements, components, and/or groups thereof.

The corresponding structures, materials, acts, and equivalents (e.g., of all means or step plus function elements) that may be in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications, variations, substitutions, and any combinations thereof will be apparent to those of ordinary skill in the art without departing from the scope and spirit of the disclosure. The implementation(s) were chosen and described in order to explain the principles of the disclosure and the practical application, and to enable others of ordinary skill in the art to understand the disclosure for various implementation(s) with various modifications and/or any combinations of implementation(s) as are suited to the particular use contemplated.

Having thus described the disclosure of the present application in detail and by reference to implementation(s) thereof, it will be apparent that modifications, variations, and any combinations of implementation(s) (including any modifications, variations, substitutions, and combinations thereof) are possible without departing from the scope of the disclosure defined in the appended claims.

What is claimed is:

1. A computer-implemented method comprising:
    storing, by a computing device, —a data encryption key in a keystore;
    generating a plurality of system values, wherein a threshold number of the plurality of system values is required to access the data encryption key from the keystore;
    storing the plurality of system values in a plurality of different locations;
    deleting more system values of the plurality of system values than the threshold number of the plurality of system values required to access the data encryption key from the keystore;
    removing the data encryption key from the keystore, wherein deleting more system values of the plurality of system values than the threshold number of the plurality of system values required to access the data encryption key includes reprogramming at least a portion of the plurality of system values with new system values after the data encryption key has been removed; and
    writing a new copy of the keystore from the data encryption key such that the new copy of the keystore is protected with the new system values.

2. The computer-implemented method of claim 1 wherein at least one location of the plurality of different locations includes electrically erasable programmable read-only memory.

3. The computer-implemented method of claim 1 wherein at least one location of the plurality of different locations includes a self-encrypting hard drive (SED).

4. The computer-implemented method of claim 3 wherein a range on the SED stores one or more of the plurality of system values.

5. The computer-implemented method of claim 4 further comprising locking the range on the SED with a unique PIN.

6. The computer-implemented method of claim 3 wherein the data encryption key is a unique data encryption key provisioned for the SED.

7. The computer-implemented method of claim 1 wherein writing the new copy of the keystore from the data encryption key includes the keystore becoming inaccessible in response to removing the data encryption key from the keystore.

8. A computer program product residing on a non-transitory computer readable storage medium having a plurality of instructions stored thereon which, when executed across one or more processors, causes at least a portion of the one or more processors to perform operations comprising:
    storing —a data encryption key in a keystore;
    generating a plurality of system values, wherein a threshold number of the plurality of system values is required to access the data encryption key from the keystore;
    storing the plurality of system values in a plurality of different locations;
    deleting more system values of the plurality of system values than the threshold number of the plurality of system values required to access the data encryption key from the keystore;
    removing the data encryption key from the keystore, wherein deleting more system values of the plurality of system values than the threshold number of the plurality of system values required to access the data encryption key includes reprogramming at least a portion of the plurality of system values with new system values after the data encryption key has been removed; and
    writing a new copy of the keystore from the data encryption key such that the new copy of the keystore is protected with the new system values.

9. The computer program product of claim 8 wherein at least one location of the plurality of different locations includes electrically erasable programmable read-only memory.

10. The computer program product of claim 8 wherein at least one location of the plurality of different locations includes a self-encrypting hard drive (SED).

11. The computer program product of claim 10 wherein a range on the SED stores one or more of the plurality of system values.

12. The computer program product of claim 11 wherein the operations further comprise locking the range on the SED with a unique PIN.

13. The computer program product of claim 10 wherein the data encryption key is a unique data encryption key provisioned for the SED.

14. A computing system including one or more processors and one or more memories configured to perform operations comprising:
　storing a data encryption key in a keystore;
　generating a plurality of system values, wherein a threshold number of the plurality of system values is required to access the data encryption key from the keystore;
　storing the plurality of system values in a plurality of different locations;
　deleting more system values of the plurality of system values than the threshold number of the plurality of system values required to access the data encryption key from the keystore;
　removing the data encryption key from the keystore, wherein deleting more system values of the plurality of system values than the threshold number of the plurality of system values required to access the data encryption key includes reprogramming at least a portion of the plurality of system values with new system values after the data encryption key has been removed; and
　writing a new copy of the keystore from the data encryption key such that the new copy of the keystore is protected with the new system values.

15. The computing system of claim 14 wherein at least one location of the plurality of different locations includes one of an electrically erasable programmable read-only memory and a self-encrypting hard drive (SED).

16. The computing system of claim 15 wherein a range on the SED stores one or more of the plurality of system values.

17. The computing system of claim 16 wherein the operations further comprise locking the range on the SED with a unique PIN.

18. The computing system of claim 15 wherein the data encryption key is a unique data encryption key provisioned for the SED.

* * * * *